(12) United States Patent
Agtuca (10) Patent No.: US 8,421,253 B2
(45) Date of Patent: Apr. 16, 2013

(54) EXHAUST GAS POWER RECOVERY APPARATUS AND FLEX GENERATOR

(76) Inventor: Pete Agtuca, Auburn, WA (US)

( * ) Notice: Subject to any disclaimer, the term of this patent is extended or adjusted under 35 U.S.C. 154(b) by 338 days.

(21) Appl. No.: 12/849,445

(22) Filed: Aug. 3, 2010

(65) Prior Publication Data

US 2011/0025057 A1 Feb. 3, 2011

Related U.S. Application Data

(60) Provisional application No. 61/230,819, filed on Aug. 3, 2009.

(51) Int. Cl.
*F03B 13/00* (2006.01)
*F03B 13/10* (2006.01)
*H02P 9/04* (2006.01)

(52) U.S. Cl.
USPC .......................................................... 290/43

(58) Field of Classification Search ............ 290/43, 290/52, 54, 49
See application file for complete search history.

(56) References Cited

U.S. PATENT DOCUMENTS

2002/0040581 A1* 4/2002 Finger et al. ................... 60/607

* cited by examiner

*Primary Examiner* — Javaid Nasri
*(74) Attorney, Agent, or Firm* — Dean A. Craine (57) ABSTRACT

An apparatus and method for generating electricity from relatively low velocity exhaust gas. The apparatus includes a plurality of axial flux generators perpendicularly mounted on a support ring that is axially aligned around the exhaust gas port opening. Each axial flux generator includes a plurality of radially aligned blades mounted on a rotating hub. The hub is mounted on a stationary axle supported above the support ring by brackets. Attached to the hub are two magnetic discs each with a plurality of magnets attached thereto. Located on the outside surface of each magnet disc is a flux disc that produces an inward force to hold the two magnet discs together. Mounted on the axle and located between the two magnetic discs is a fixed stator disc that includes three internal coil systems. When the exhaust gas moves through the exhaust port it interacts with the blades causing the two magnetic discs to rotate around the stator disc and thereby induces an electric current inside each coil system. The apparatus also includes an adjustable inverter that allows the operator to adjust the load on the generator so that the blower operates optimally.

12 Claims, 15 Drawing Sheets

EXHAUST GAS POWER RECOVERY APPARATUS AND FLEX GENERATOR

This utility patent application is based on and claims the filing date benefit of the U.S. provisional patent application (61/230,819) filed on Aug. 3, 2009.

BACKGROUND OF THE INVENTION

1. Field of the Invention

This invention relates to exhaust energy recovery systems, and more particularly to such systems specifically designed to be used with low velocity exhaust systems.

2. Description of the Related Art

Manufacturing buildings and large warehouses typically have exhaust vents mounted on their sides or roofs through which exhaust gas, dust and smoke produced by machinery operated inside the building is expelled into the outside atmosphere. Large blowers on machinery operating inside the building force exhaust gas, dust and smoke outward through intervening ducts and eventually to exhaust vents. During installation, specific ducts and exhaust vents are chosen so that any back pressure created in the system is minimized. When modifying an existing exhaust system or when designing a new exhaust system with new components, it is important to consider the impact the changes or new components may have on the back pressure exerted on the blower.

In many manufacturing and warehouse buildings, electrical exhaust blowers may operate 24 hours a day and 7 days a week. Needless to say, the electricity costs to operate these blowers can be very expensive. An electrical energy recovery apparatus that enables operators to partially recover the energy from the exhaust gas produced by these blowers would be highly desirable. Such apparatuses that could be used in a new installation or retro-fitted into an existing exhausts system that does not generate excessive back flow pressure would be especially more desirable.

SUMMARY OF THE INVENTION

Accordingly, these and other objects of the invention are met by an apparatus for generating electricity from exhaust gas produced by a piece of machinery.

The apparatus includes a plurality of axial flux generators mounted on a support ring that is positioned around the machine's exhaust port. The exhaust port is normally located on the roof or side of a building. Each axial flux generator includes a rotating hub disposed around on a fixed axle. Attached to the rotating hub is a plurality of radially extending blades that extend into the path of the exhaust gas that flows through the exhaust port and the ring's center opening. Also attached to the hub and inside the blades are two magnetic discs. Each magnetic disc has the same size and number of plate magnets mounted thereon. The magnets of the opposite magnetic discs are aligned so that their respective polarities are aligned in opposite directions when mounted on the hub so that magnets on the two discs attract.

Located on the outside surface of each magnet disc is a flux disc. In one embodiment, each flux disc is made of magnetic attractive material so that the magnets on the adjacent magnetic disc create an inward directional force that presses inward to hold the magnetic discs together.

Located in between the two magnetic discs is a stator disc. The stator disc is fixed to the axle so that the two magnetic flux disc may be rotated around the stator disc. Formed inside the stator disc are three coil systems in which an electric current is induced when the two magnetic discs rotated around the stator disc. The wires from the three coils systems extend into through the axle and connected to disconnect switch.

During use, the axle is held in a suspended position over the support ring so that exhaust air flowing through the exhaust port and contacts the blades and causes the hub and the two magnetic discs attached thereto to rotate around the stator disc. An electric current is then created in each coil system inside the stator disc.

As an optional feature, a means for cooling the inner stator disc is also provided to reduce heat build up.

During operation, the hub and magnetic discs rotate around the stationary stator disc. The three wires from the each axial flux generator are connected to the same three wires to create a three phase A.C. electric current. The three wires may be connected to an optional rectifier to create a D.C. current.

The apparatus also includes a control panel that has a main disconnect switch, a rectifier, an inverter, and a load center that connects to an outside electrical power grid. The inverter includes electronics and a software program that allows the operator to adjust the amount of load on the generator so that the blower's operational base line measurements (electrical power usage (Watts), ductwork pressure differential, and exhaust gas velocity) are maintained. At a particular site, the size of the exhaust port and the size of the blower motor may vary. The velocity of the exhaust blowing through the exhaust port typically varies 50 to 200 mph. In most instances, the installer selects axial flux generators with blades that extend across the exhaust port between 25% to 50% of the diameter of the exhaust port. The installer can adjust the number of axial flux generators used around the exhaust port. After installation, the installer then 'fine tunes' the apparatus using the software program to reprogram the inverter.

DESCRIPTION OF THE PREFERRED EMBODIMENT(S)

Referring to the FIGS. 1-15, an apparatus 10 for generating electricity from exhaust gas 13 produced by a piece of machinery that flows through an exhaust port 8 is shown and described. The apparatus 10 includes a plurality of axial flux generators 20 mounted on a support ring 15 positioned around the machine's exhaust port 8. The support ring 15 includes center opening 16 that is aligned and registered over the exhaust port 8. The support ring 15 also includes a plurality of perpendicularly aligned brackets 17 evenly spaced apart around the central opening 16. Two adjacent brackets 17 securely hold a fixed axle 22 used with each generator 20 in a fixed position.

Figure 1:
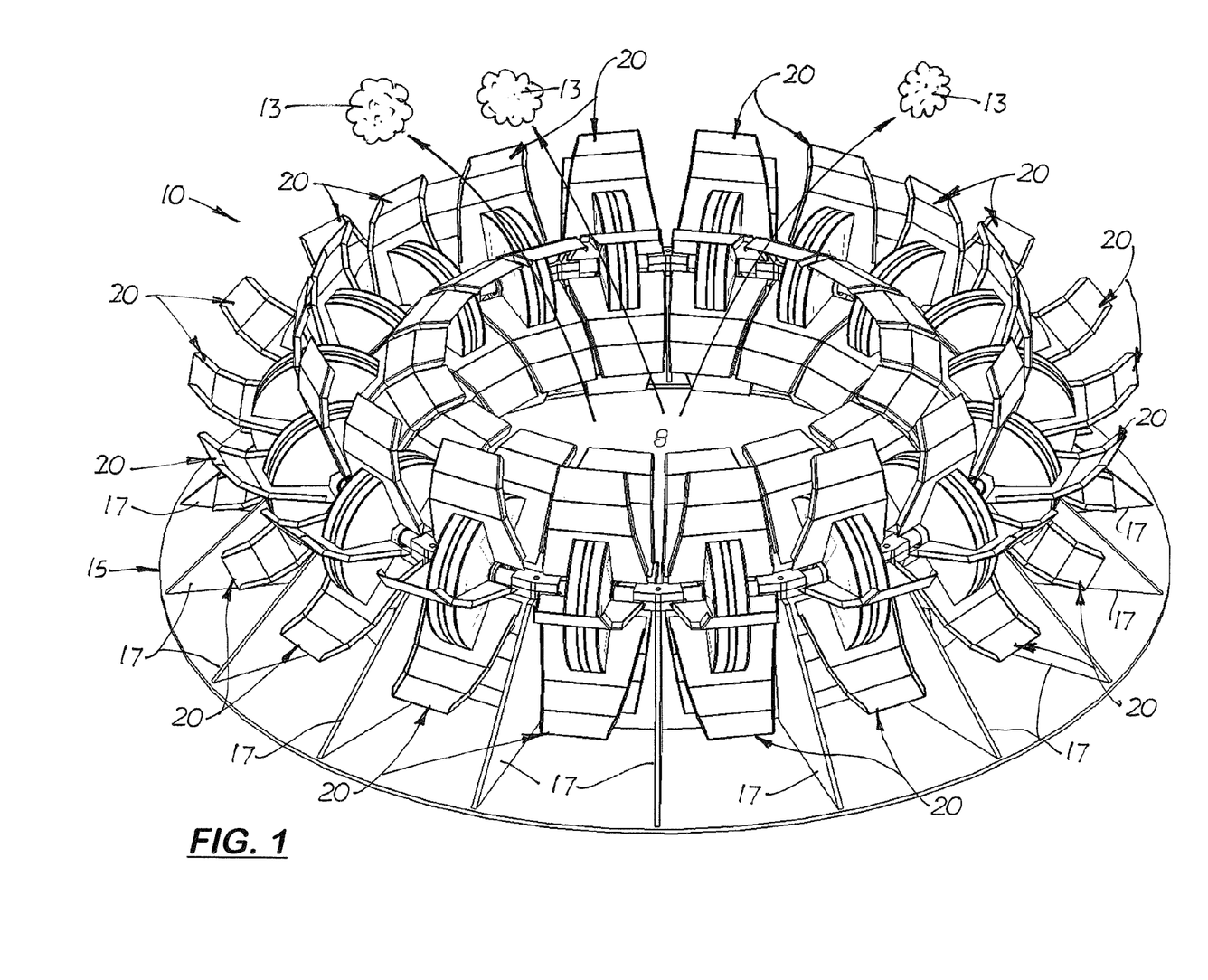
FIG. 1 is a perspective view of a plurality of axial flux generators mounted on a support ring and placed over an exhaust vent.
Figure 2:
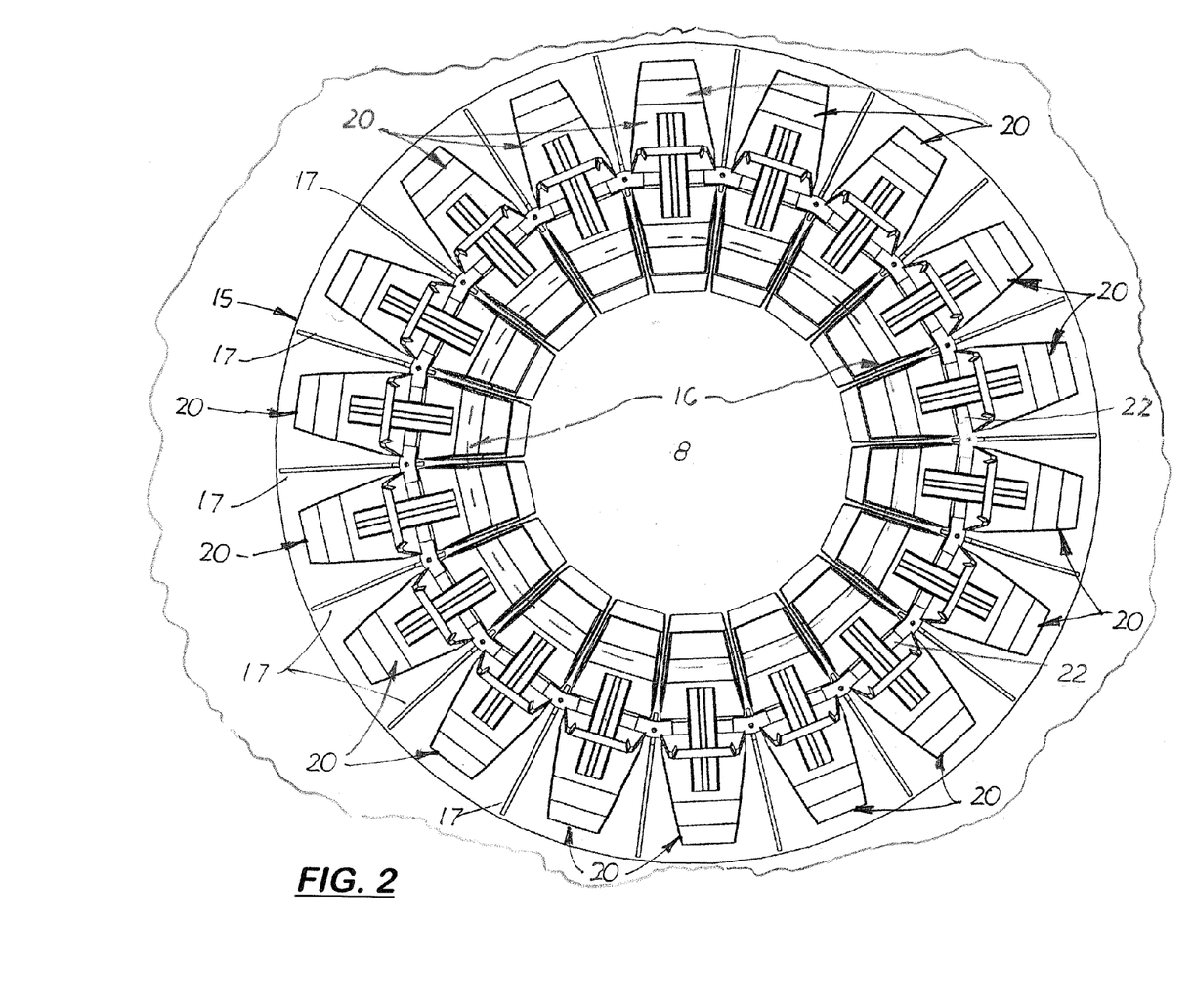
FIG. 2 is a top plan view of the axial flux generators shown in FIG. 1.
Figure 3:
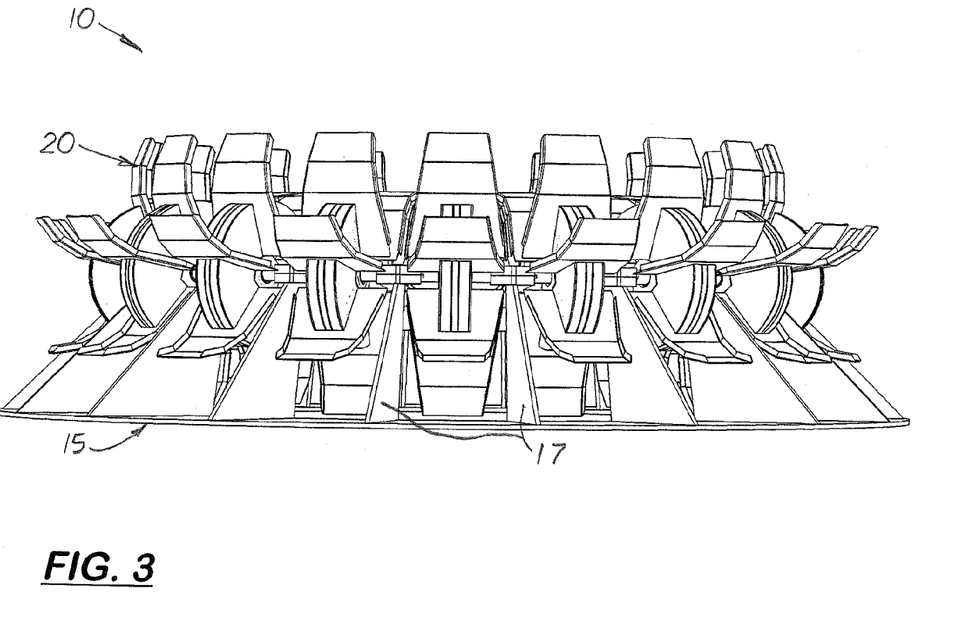
FIG. 3. is a side elevational view of the axial flux generators shown in FIGS. 1 and 2.
Figure 4:
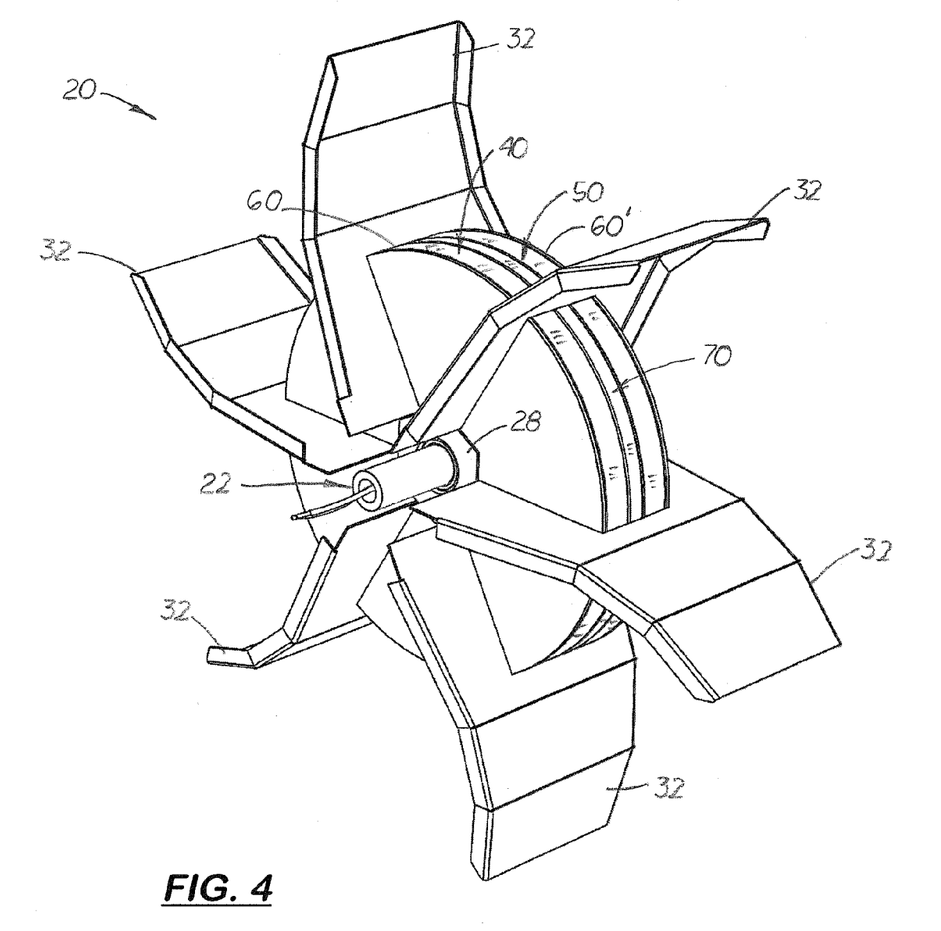
FIG. 4 is a perspective view of one axial flux generator.
Figure 5:
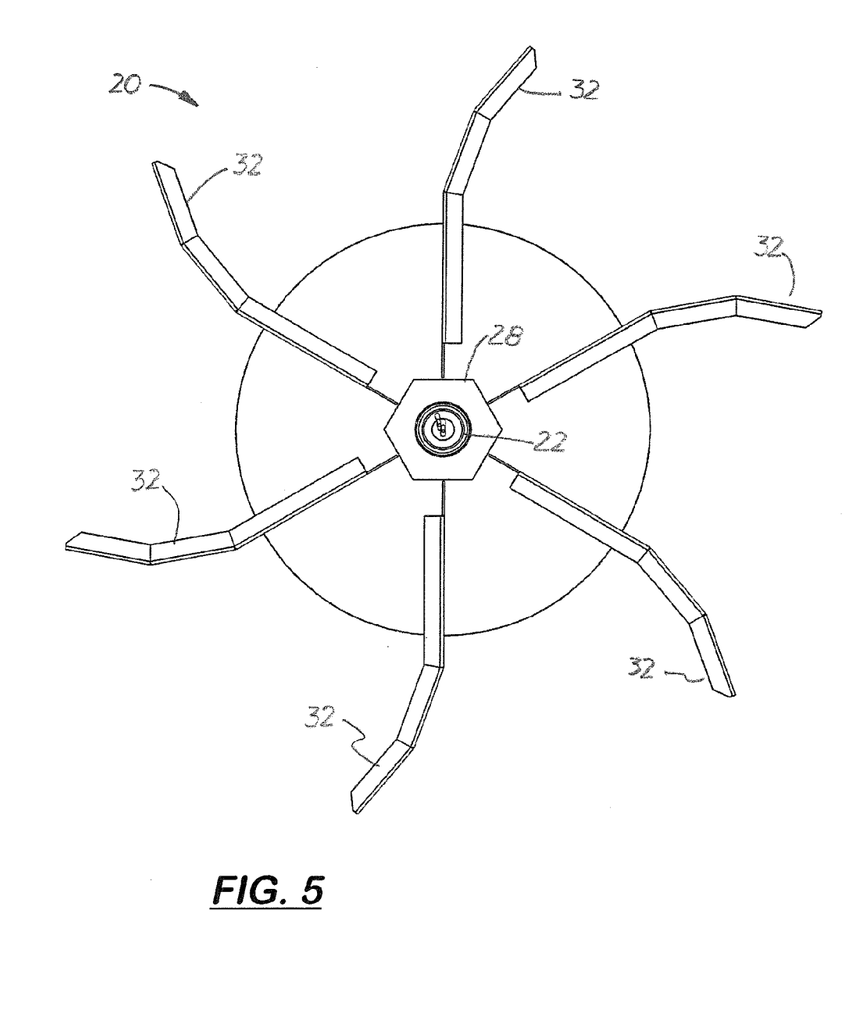
FIG. 5 is a front elevational view of the axial flux generator shown in FIG. 4.
Figure 6:
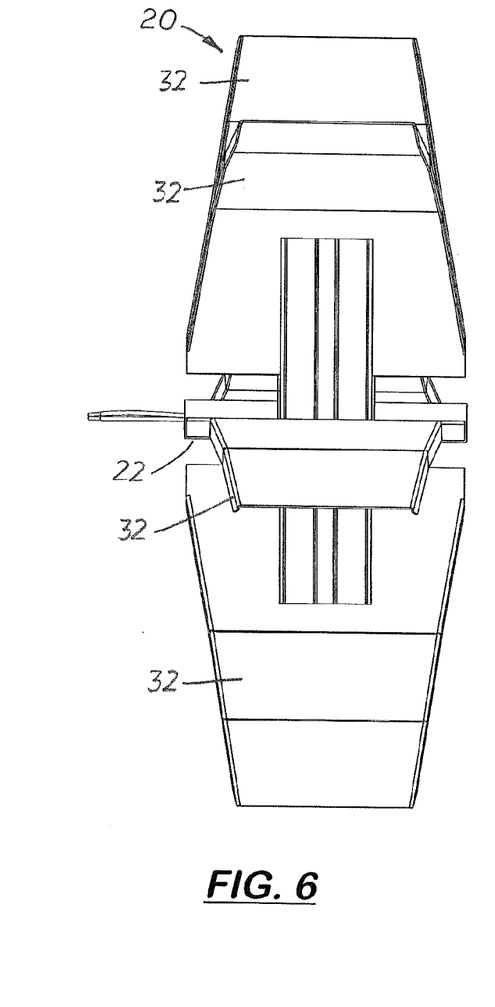
FIG. 6 is a side elevational view of the axial flux generator shown in FIGS. 4 and 5.

As shown in FIGS. 4-6, each axial flux generator 20 includes a rotating hub 28 disposed around on the fixed axle 22. Attached to the hub 28 is a plurality of radially extending blades 32 that rotate and extend into the path of the exhaust gas 13 that flows through the ring's center opening 16 when it is aligned and registered over the exhaust port 8.

Figure 8:
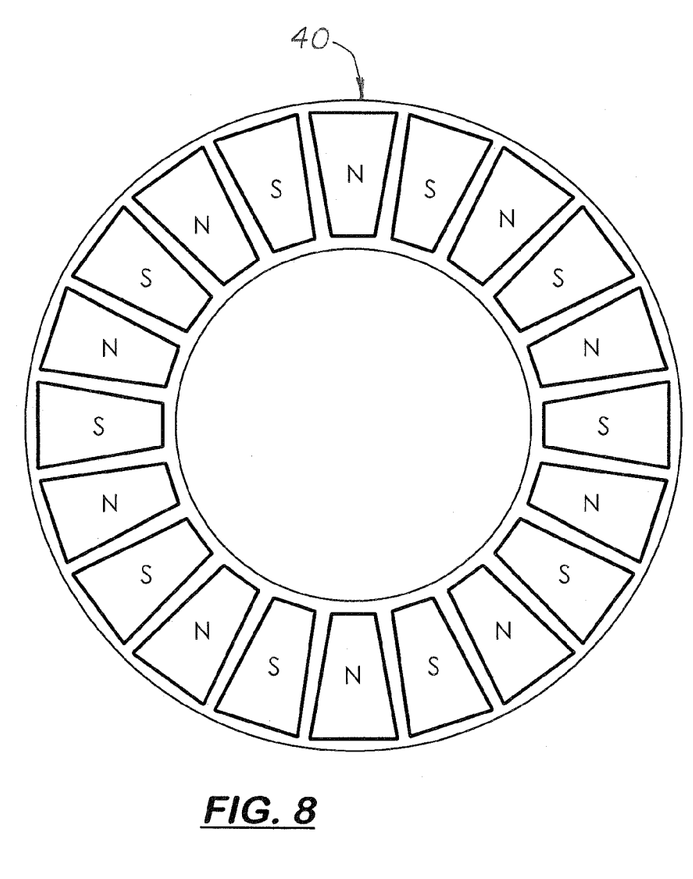
FIG. 8 is a top plan view of a first magnetic disc showing the orientation of the magnet plates mounted thereon.
Figure 9:
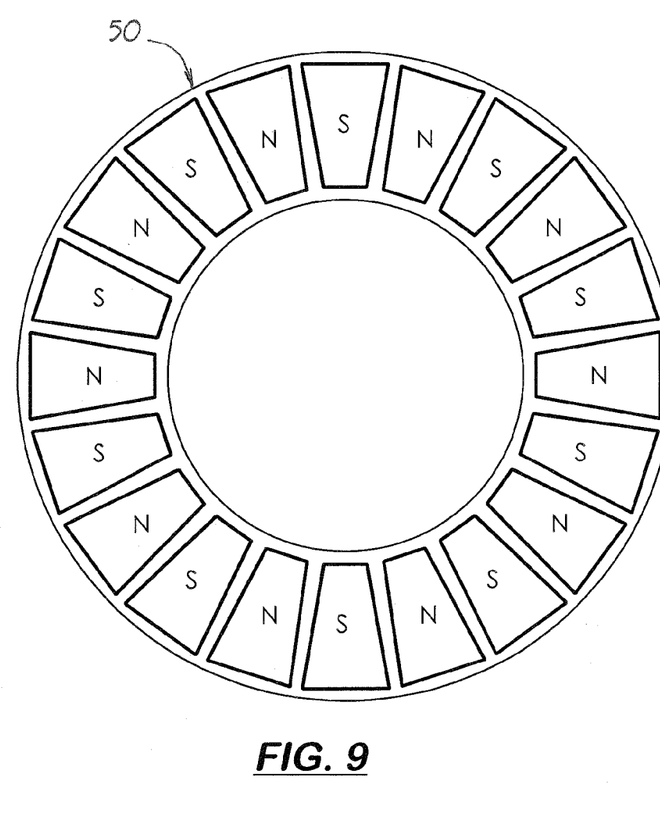
FIG. 9 is a top plan view of a second magnetic disc showing the orientation of the magnet plates mounted thereon.
Figure 10:
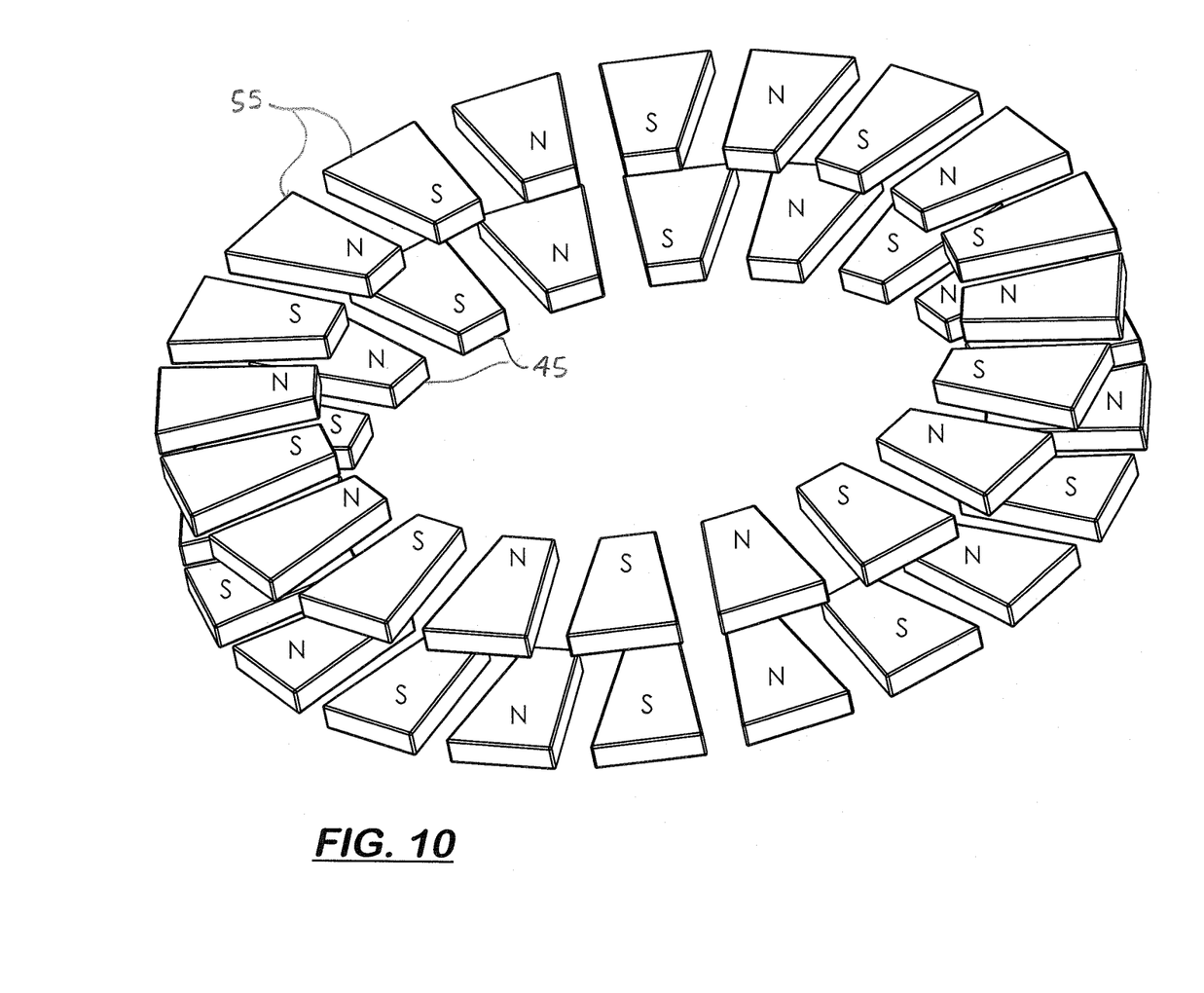
FIG. 10 is a perspective view of the two magnetic disc shown in a side by side postion with the magnet plates alternatively aligned so that the inside surfaces of the magnet plates attract.

Attached to the hub 28 and inside the blades 32 is a disc assembly 38 made up of two coaxially aligned magnetic discs 40, 50. Each magnetic disc 40, 50 have the same diameter and thickness and the same number of plate magnets 45, 55, respectively, radially aligned and mounted thereon. As shown in FIGS. 8-10, the plate magnets 45, 55 of the opposite magnetic discs 40, 50 are aligned so that their respective polarities are aligned parallel to the disc's outer flat surfaces and in opposite directions so that plate magnets 45, 55 on the two discs 40, 50 attract when mounted on the hub 28.

Located on the outside surface of each magnet disc 40, 50 is a flat, circular flux disc plate 60, 60'. In the first embodiment, the flux discs 60, 60' are approximately the same diameter as the magnetic discs 40, 50, respectively, and are made of magnetic attractive material so that the magnets on the adjacent magnetic discs 40, 50 create an inward directional force that presses inward to hold the two magnetic discs 40, 50 together in a coaxial position on the hub 28.

Figure 7:
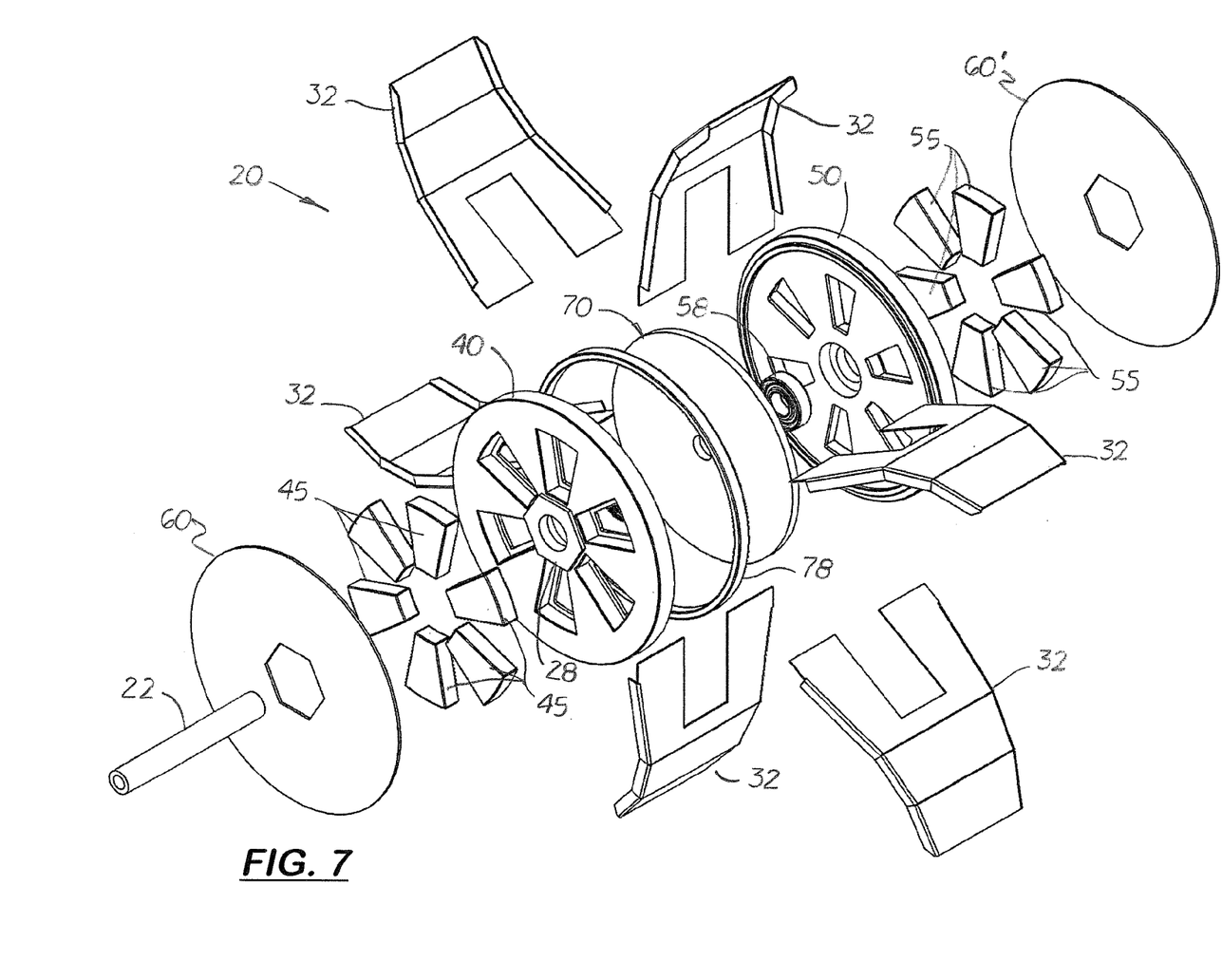
FIG. 7 is an exploded perspective view of an axial flux generator.
Figure 11:
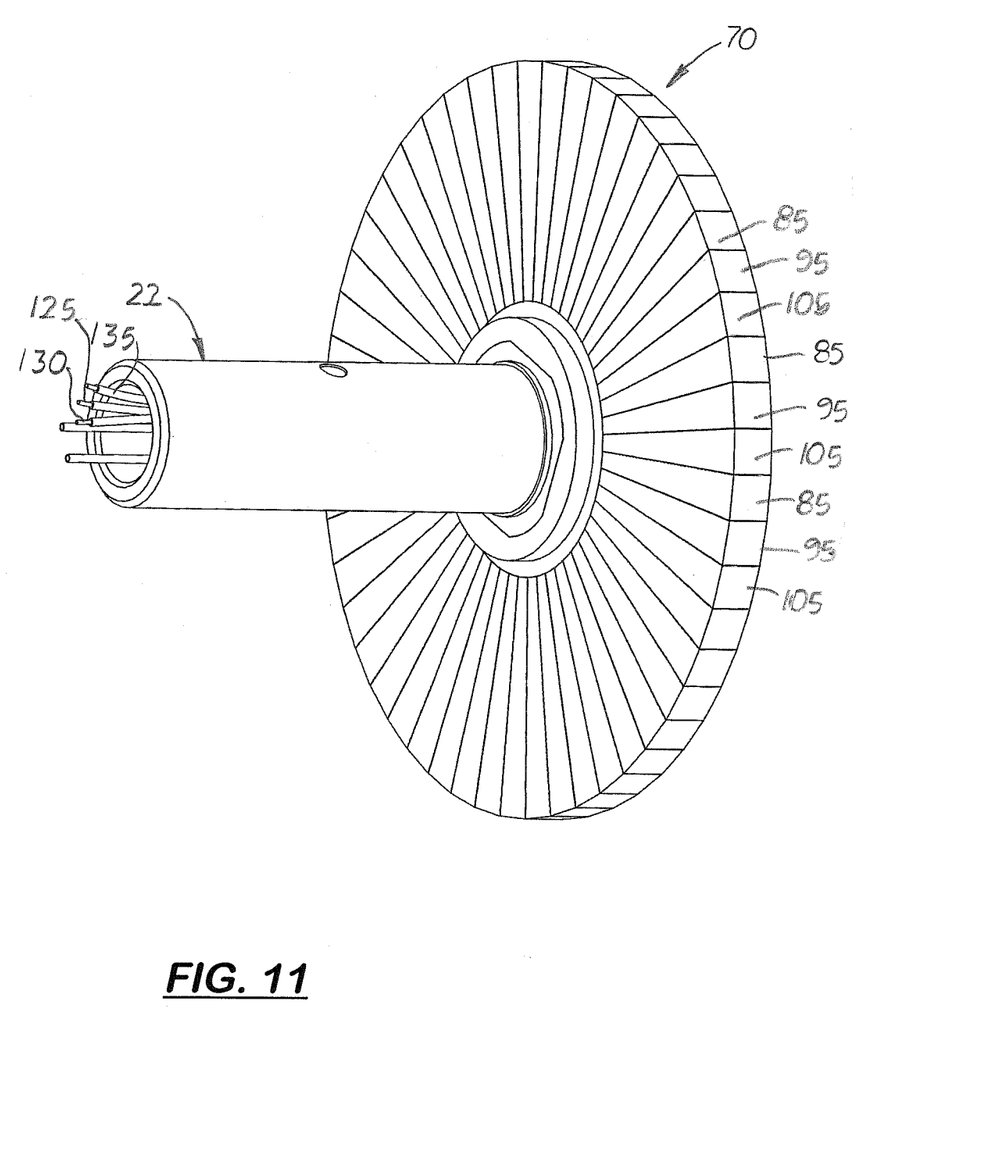
FIG. 11 is a perspective view of the stator disc mounted on the axial.
Figure 12:
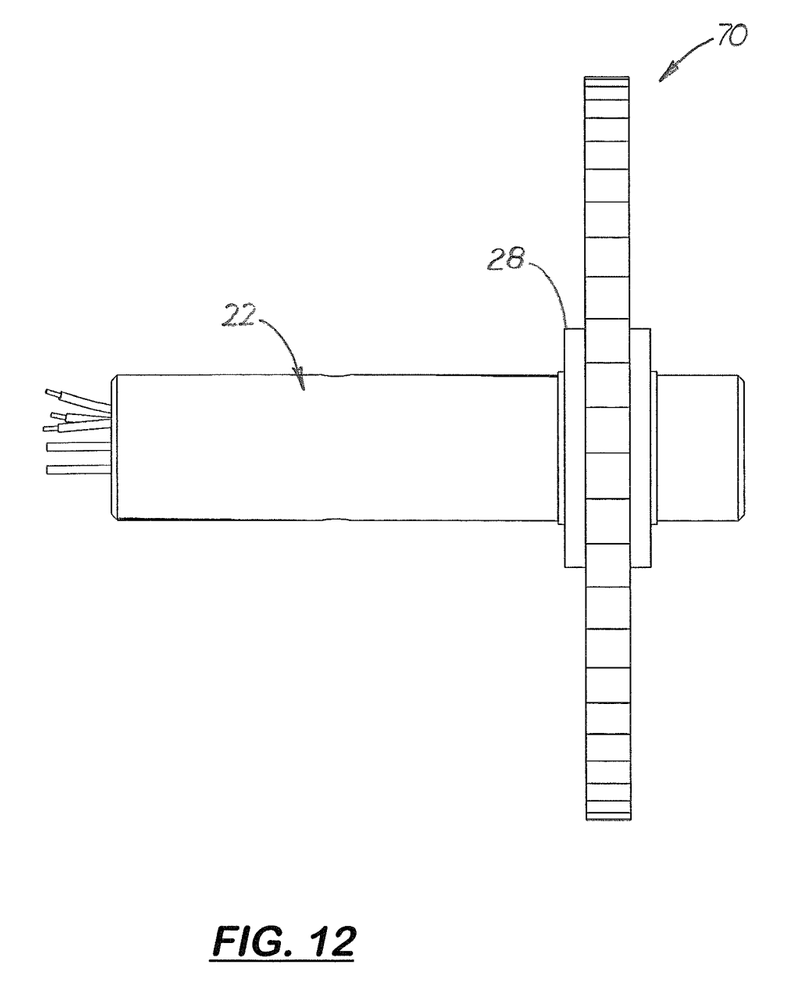
FIG. 12 is a side elevational view of the stator disc shown in FIG. 8.
Figure 13:
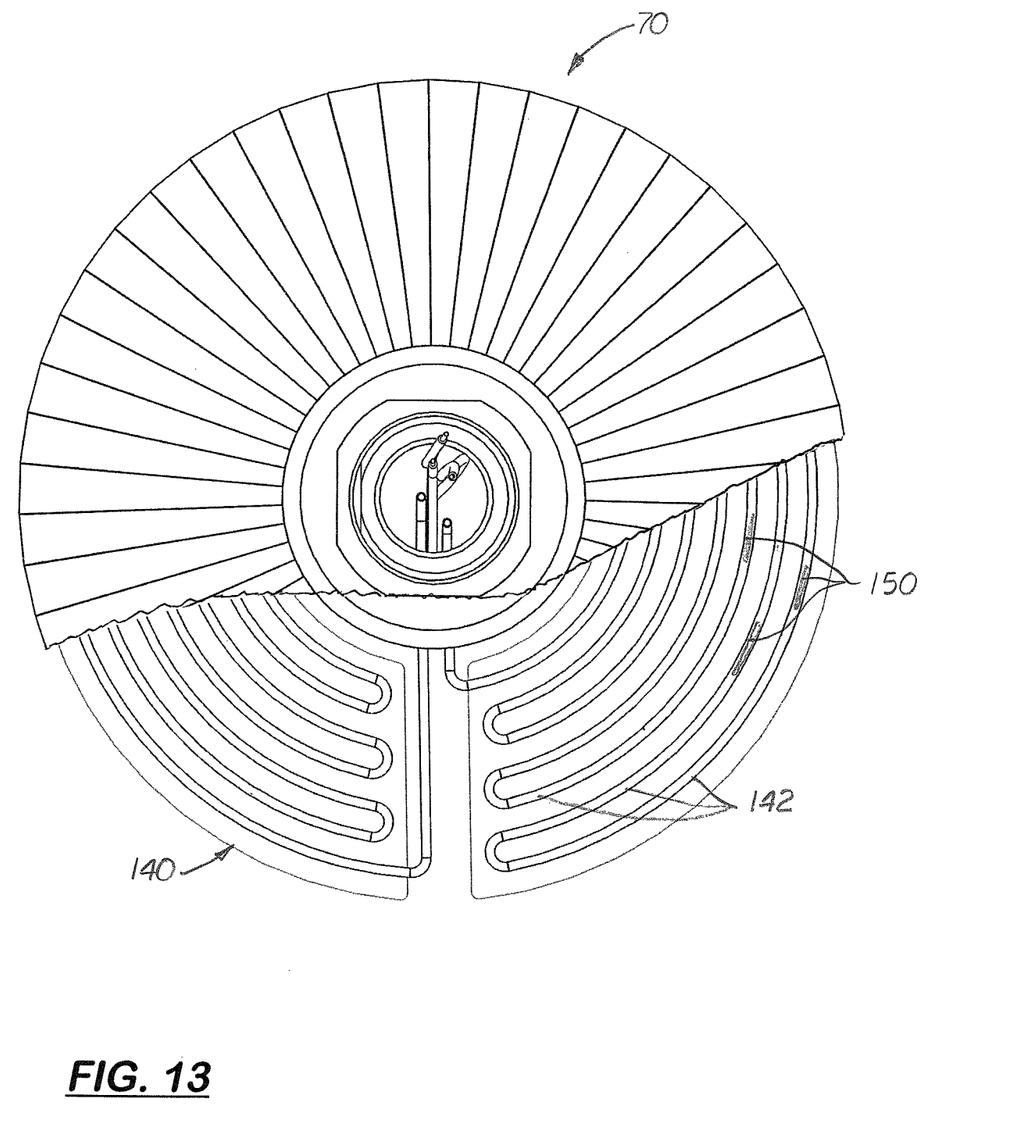
FIG. 13 is a partially broken, front plan view of the stator disc shown in FIGS. 11 and 12 showing the position of the optional cooling disc.
Figure 14:
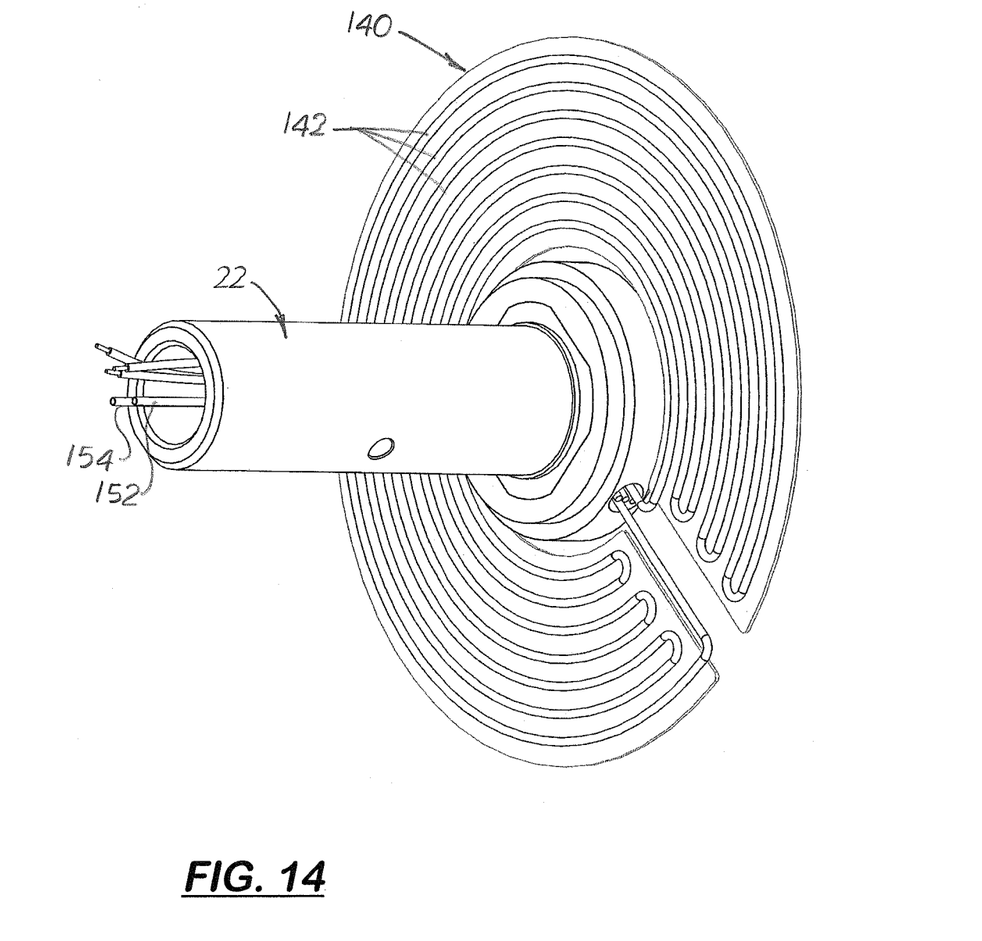
FIG. 14 is a perspective view of the cooling disc mounted on the axial.
Figure 15:
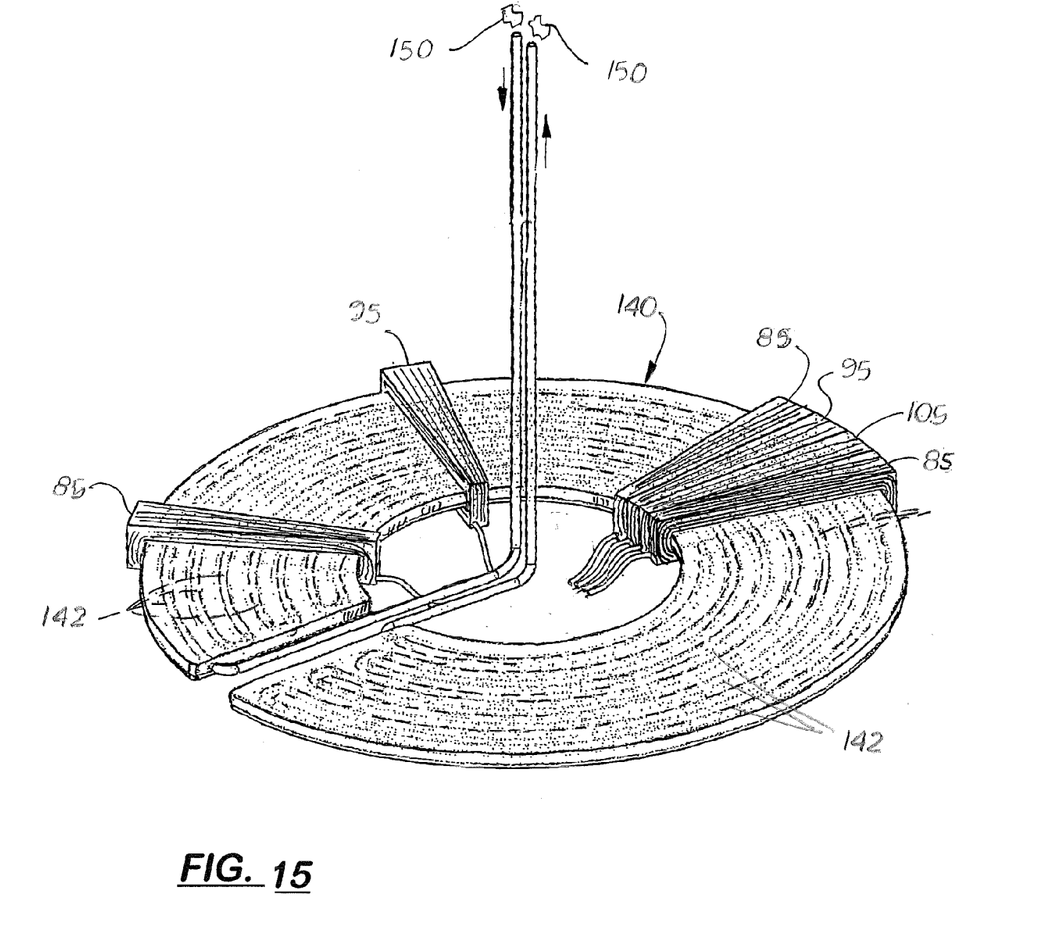
FIG. 15 is a perspective view of the cooling disc showing its relative location with respect to the windings used on the stator disc.

Each axial flux generator 20 also includes a flat circular stator disc 70 fixed on the axle 22. As shown in FIG. 7, the stator disc 70 fits inside a thin, outer protective ring 78. As shown in FIG. 11, formed in the stator disc 70 are three, alternating radially aligned coil systems 85, 95, 105. The wires 125, 130, and 135 from the three coils systems 85, 95, and 105, respectively, extend down through the axle 22 and joined with the identical wires from the adjacent flux generator 20.

Each coil system 85, 95, 105 in the stator disc 70 includes a coil loop 86, 96, 106, respectively. The three coil loops 86, 96, 106 are serially connected together by three wires 125, 130, 135 that extend through the axle 22. The ends of the three wires 125, 130, 135 extend through the end of the stationary axle 22 connect to a rectifier (not shown). With three wires 125, 130, 135 have a three phase A.C. electric current that is created when the magnetic discs 40, 50 are rotated around the stator disc 70.

The stator disc 70 is made of non-metallic material such as fiberglass. Each coil track loop 85, 95, 105 is made of copper wire which is radially aligned in the stator disc 70.

During operation, the stator disc 70 becomes hot. To reduce heat, an optional feature means for cooling the stator disc 70 may also be provided. In embodiment shown in the FIGS. 13 and 14, the means for cooling is a thin conduit disc 140 located inside the stator disc 70. The conduit disc 140 includes a continuous conduit track 142 that is wound in a spiral configuration on the conduit disc 140 inside the stator disc 70. During use, a suitable coolant flows continuously flows into the conduit track 142 and then outward through the axial 22 via inlet and outlet tubes 152, 154 which are joined with similar tubes from adjacent generators and connected to an external cooling radiator (not shown) to remove excess heat from the stator disc 70.

The two rotating magnetic discs 40, 50 are made of ferric material, such as steel. The stator disc 70 is made of a plurality of coil track loops 85, 95, 105 embedded in a thin disc made of lightweight insulation material, such as fiberglass.

Because the blades 320 are perpendicularly aligned to the direction of flow of the exhaust gas 13 and because the generator assembly 10 is located outside the flow of the exhaust gas, and backflow pressure created by the apparatus 10 is minimized.

Figure 16:
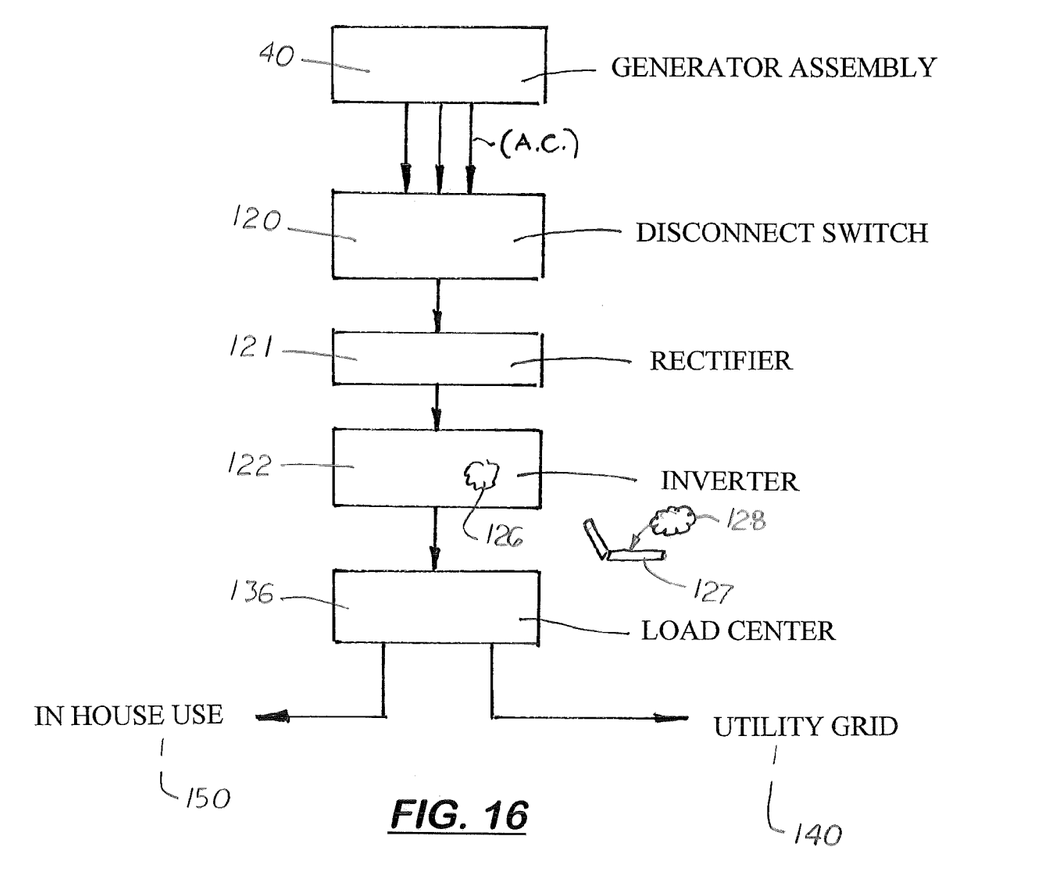
FIG. 16 is a block diagram showing how the electrical energy produced by the generators is transferred and utilized in-house or by the outside electrical grid.

FIG. 16 is a flow chart that shows how the apparatus's generator assembly 40 is connected is a utility grid 140 or to the building electrical system 150. The generator assembly 20 connected to a disconnect switch 120. The rectifier 121 is connected to an inverter 122. The inverter 122 is connected to a load center 136 which then delivers the A.C. current produced by the generator assembly 40 to either the utility gird 140 or to the building's electrical system 150.

The inverter 122 includes electronics (hardware) 126 and a software program 128 that allows the operator to adjust the amount of load on the generator assembly 40 so that the blower's 12 operational base line measurements (electrical power usage (Watts), ductwork pressure differential, and exhaust gas velocity) are maintained. If the apparatus 10 is installed into an existing blower exhaust system, prior to removing the old muffler and duct work, an energy audit of the old system if first conducted. During the energy audit, the amount of electrical energy the blower motor uses, the velocity of the exhaust as it leaves the blower, and the duct pressure are measured. These three parameters provide a baseline for the old blower 12. The load on the generator assembly 40 s then adjusted to that the baseline is obtained.

Figure 17:
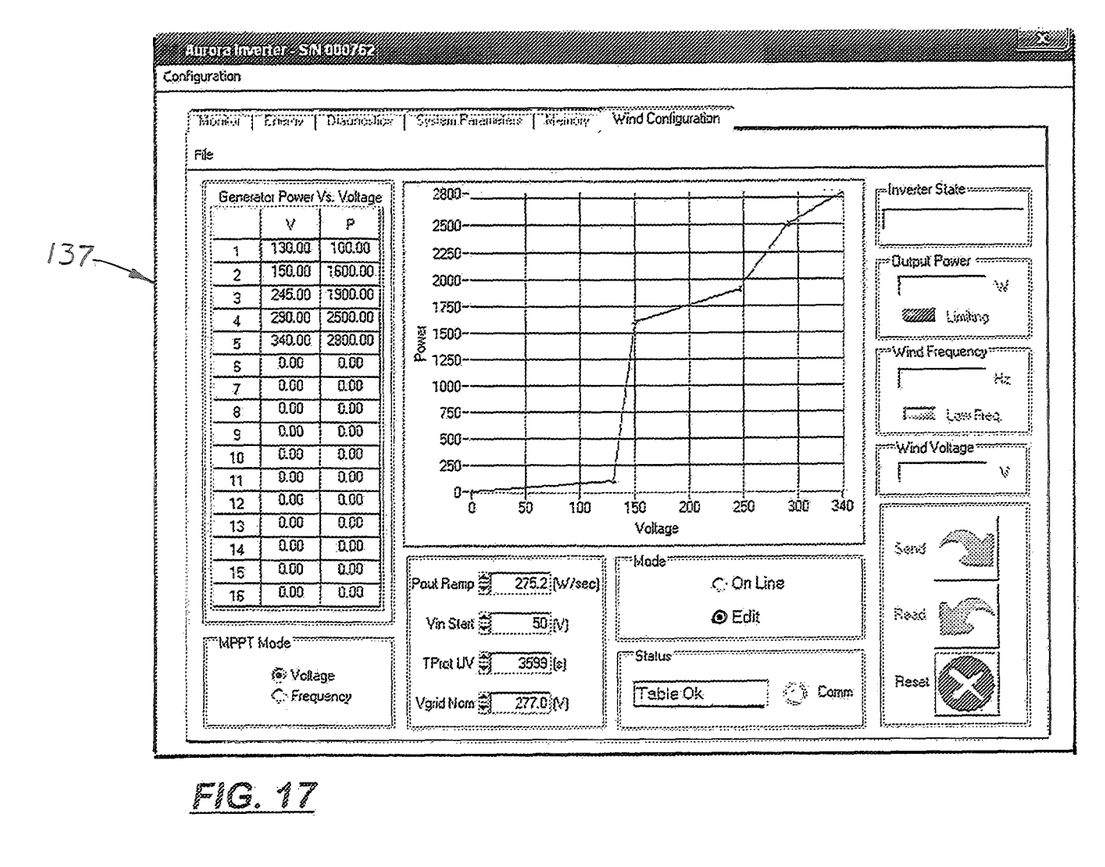
FIG. 17 is an illustration of the menu page generated the maximum power point tracking software program that is used to adjust the load on the flex generators so that the blower operates within its baseline.

After the energy audit is conducted, a portable computer (i.e. laptop) 127 with a maximum power point tracking software program 128 (known as a MPPT software program) is loaded into its memory. Such programs are commonly available through companies that manufacture electrical inverters. The portable computer 127 is then connected to a communication port 132 on the inverter 122. The software program 128 is then executed and the electrical power, velocity and pressure differentials are then inputted to the portable computer 127. The software program 128 generates the menu page 137 shown in FIG. 17. The operator then uses the software program 128 to adjust the amount of load exerted by the inverter so that the blower 12 operates most efficiently.

It should be understood that the support ring is selected to match the size of the exhaust port. The size of the blades and the number of axial flux generators (at least two) attached to the support ring can be adjusted depending on the size of the exhaust port, the size of the blower, and the velocity of the exhaust gas through the exhaust port. A balance is reached between maximizing the amount of electricity produced and the creation of excessive backflow on the blower.

Using the above described apparatus, a method for generating electricity from a relatively low velocity exhaust gas source is provided comprising the following steps:

a. selecting a piece of equipment that produces exhaust gas and delivers it through an exhaust vent;

b. selecting an exhaust gas electricity generator that includes a fixed axle; an inner stator disc mounted on said fixed axle, said stator disc includes at least one coil located therein capable of generating an electric current when said stator disc is rotated between two magnetic fields, two outer magnetic discs spaced apart and rotatably mounted on said axle on opposite sides of said stator disc, each said magnetic disc including at least two magnets with sides having opposite polarity facing inward toward said stator disc, a metallic flux plate located over the outside surface of each said outer magnetic disc and a plurality of radially aligned blades attached to said outer magnetic discs capable of extending into the flow of exhaust air flowing adjacent to said generator thereby causing said magnetic discs to rotate around said stator disc and produce an electric current on said coil.

c. mounting said exhaust gas electricity generator adjacent to an exhaust vent so that exhaust air may flow rotate said blades;

d. connected said generator assembly to an electricity distribution system; and, e. activating said piece of machinery to produce exhaust that is converted into electricity.

In compliance with the statute, the invention described herein has been described in language more or less specific as to structural features. It should be understood however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An axial flux generator for generating electricity from exhaust gas, comprising:
   a. a fixed axle;
   b. a rotating hub located on said fixed axle;
   c. an inner stator disc mounted on said fixed axle, said stator disc includes at least one coil located therein capable of generating an electric current when a magnetic field is rotated around said stator disc;
   d. two outer magnetic discs spaced apart and mounted on said hub and on opposite sides of said stator disc, each said magnetic disc including at least two magnets mounted on its inside surface with opposite polarity facing inward toward said stator disc;
   e. a metallic flux plate located over the outside surface of each said magnetic disc; and,
   f. a plurality of radially aligned blades attached to said hub and extending beyond said magnetic discs and into the flow of exhaust gas flowing adjacent to said apparatus thereby causing said magnetic discs to rotate around said stator disc and produce an electric current on said coil.

2. The apparatus, as recited in claim 1, further comprising a means for cooling said stator disc.

3. The apparatus, as recited in claim 2, wherein said means for cooling said stator disc is a conduit disc disposed inside said stator disc, said conduit disc includes a conduit track filled with a re-circulated liquid coolant.

4. The apparatus, as recited in claim 1, wherein said stator disc includes a plurality of coil windings divided into three groups, said groups being alternatively arranged over said stator disc, said coil windings in each group being serially connected together so that an A.C. current is produced from said generator assembly.

5. The apparatus, as recited in claim 1, further including an adjustable inverter used to adjust the amount of electricity produced by each said axial flux generator.

6. The apparatus, as recited in claim 5, wherein said adjustable inverter includes a maximum power tracking software program used to adjust the amount of electricity produced by each said axial flux generator.

7. An exhaust gas power recovery apparatus for a building with an exhaust port, said apparatus comprises:
   a. a support ring mounted around an exhaust port on a building;
   b. a plurality of axial flux generators equally spaced around and mounted on said support ring, each said axial flux generator includes a fixed axle, a rotating hub located on said fixed axle, an inner stator disc mounted on said fixed axle, said stator disc includes at least one coil located therein capable of generating an electric current when a magnetic field is rotated around said stator disc, and two outer magnetic discs spaced apart and mounted on said hub and on opposite sides of said stator disc, each said magnetic disc including at least two magnets mounted on its inside surface with opposite polarity facing inward toward said stator disc, said stator disc including three alternatively and radially aligned coil systems that produce an electric current when said magnetic discs are rotated around said stator disc, each said coil system being connected to a common wire that extends through said axle, each said axial flux generator includes a metallic flux plate located over the outside surface of each said magnetic disc, and a plurality of radially aligned blades attached to said hub and extending beyond said magnetic discs and into the flow of exhaust flowing adjacent to said apparatus thereby causing said magnetic discs to rotate around said stator disc and produce an electric current on said coil;
   c. an programmable inverter electrically connected to said axial flux generator; and,
   d. a software program loaded into said inverter and used to adjust the electrical output from each said axial generator so that the flow of exhaust gas through said exhaust port and the electrical output from each said axial flux generator is optimized.

8. The apparatus, as recited in claim 7, further comprising a means for cooling said stator disc.

9. The apparatus, as recited in claim 8, wherein said means for cooling said stator disc is a conduit disc disposed inside said stator disc, said conduit disc includes a conduit track filled with a re-circulated liquid coolant.

10. A method for converting exhaust air from a piece of machinery into electricity comprising the following steps:
   a. selecting a piece of machinery that produces exhaust gas and delivers it through an exhaust vent;
   b. selecting an exhaust gas electricity generator that includes a fixed axle; an inner stator disc mounted on said fixed axle, said stator disc includes at least one coil located therein capable of generating an electric current when a magnetic field is rotated around said stator disc, two outer magnetic discs spaced apart and mounted on said hub on opposite sides of said stator disc, each said magnetic disc including at least two magnets with sides having opposite polarity facing inward toward said stator disc, a metallic flux plate located over the outside surface of each said outer magnetic disc and a plurality of radially aligned blades attached to said outer magnetic discs capable of extending into the flow of exhaust air flowing adjacent to said generator thereby causing said magnetic discs to rotate around said stator disc and produce an electric current on said coil;

c. mounting said exhaust-gas electricity generator adjacent to said exhaust vent so that said blades rotate when said exhaust gas from said machinery flows through said exhaust vent;

d. connected said electricity generator to an electricity distribution system; and, e. activating said piece of machinery to produce exhaust that flows through said exhaust vent and causes said blades to rotate and produce electricity.

11. The method as recited in claim 10, further including step (f) of connecting an adjusting inverter to said electricity generator so that a load created by said electricity generator when extended into the exhaust air enables the machinery to operate within its optimal baseline.

12. The method as recited in claim 11, wherein the step (f) of said adjusting inverter is connected to a computer with a maximum power point tracking software program loaded therein.

\* \* \* \* \*